United States Patent [19]

Remark et al.

[11] Patent Number: 5,305,360
[45] Date of Patent: Apr. 19, 1994

[54] PROCESS FOR DECONTAMINATING A NUCLEAR REACTOR COOLANT SYSTEM

[75] Inventors: John F. Remark, Gainesville, Fla.; Thomas G. Bengel, Plum Borough, Pa.

[73] Assignee: Westinghouse Electric Corp., Pittsburgh, Pa.

[21] Appl. No.: 18,138

[22] Filed: Feb. 16, 1993

[51] Int. Cl.$^5$ .............................................. G21C 19/28
[52] U.S. Cl. ..................................... 376/309; 376/310
[58] Field of Search ........................ 376/308, 309, 310

[56] References Cited

U.S. PATENT DOCUMENTS

| | | | |
|---|---|---|---|
| 3,013,909 | 12/1961 | Pancer et al. | 134/3 |
| 3,615,817 | 10/1971 | Jordon et al. | 134/3 |
| 3,873,362 | 3/1975 | Mihram et al. | 134/3 |
| 4,123,324 | 10/1978 | Sanada et al. | 176/37 |
| 4,226,640 | 10/1980 | Bertholdt | 134/3 |
| 4,508,641 | 4/1985 | Hanulik | 134/3 |
| 4,512,921 | 4/1985 | Anstine et al. | 252/626 |
| 4,731,124 | 3/1988 | Bradbury et al. | 376/310 |

OTHER PUBLICATIONS

"Chemical Decontamination of Water Reactions. CEGB Developments and the International Scene." Pick et al Nuclear Energy; 22, No. 6, pp. 433–444, Dec. 1983.

M. E. Pick, "The Nature of PWR Stainless Steel and Inconel Oxides in Relation to Decontamination in Permanganate Based (NP and AP) Processes," Water Chemistry of Nuclear Reactor Systems 3, vol. 1, British Nuclear Energy Society, London, England, 1983.

T. Suwa et al., "Development of Chemical Decontamination Process with Sulfuric Acid–Cerium (IV) for Decommissioning," Journal of Nuclear Science and Technology, 23 (7), pp. 622–632, Jul., 1986.

"Plant Decontamination Methods Review," Electric Power Research Institute, Report NP-1168, May, 1981.

*Primary Examiner*—Donald P. Walsh
*Assistant Examiner*—Frederick H. Voss
*Attorney, Agent, or Firm*—J. C. Valentine

[57] ABSTRACT

High velocity reactor coolant water in a boiling water reactor or a pressurized water reactor transports radioactive ions and particles from a nuclear reactor vessel to the balance of the reactor coolant system where they deposit on chromium (III) oxide-containing surfaces. These radioactive deposits are removed in a dilute chemical decontamination process wherein permanganate ion-containing reactor coolant water is circulated throughout a reactor coolant system to oxidize chromium (III) oxide surfaces of the system to chromium (IV) oxide. Formic acid is added to the permanganate ion-containing reactor coolant water and then the formic acid-containing water is circulated throughout the reactor coolant system to reduce unreacted permanganate ions in the reactor coolant water to manganous ions.

8 Claims, No Drawings

PROCESS FOR DECONTAMINATING A NUCLEAR REACTOR COOLANT SYSTEM

BACKGROUND OF THE INVENTION

The invention relates to a process for oxidizing metal oxides on surfaces wetted by aqueous solutions and more particularly to a process for oxidizing chromium-containing radioactive films which tend to form on the surfaces of reactor coolant systems in nuclear power plants. The invention is particularly useful for decontaminating boiling water and pressurized water reactors and thereby reducing the radiation exposure of workers during routine maintenance and operating activities, reactor refueling and plant decommissioning.

As a nuclear reactor generates electric power, the wetted surfaces of the reactor coolant system tend to corrode slightly and form surface oxides of iron, chromium, nickel, cobalt and other metals employed in the system. At least some of the corrosion products (referred to in the nuclear industry as "crud") are transported by the high velocity coolant water to the core region of the reactor vessel and become radioactive. Subsequently, the radioactivate corrosion products are retransported from the core of the reactor vessel and deposit in the balance of the reactor coolant system and thereby increase the radiation fields throughout the plant. In addition, radioactive ions such as cobalt 60 will also deposit on these surface oxides. These radioactive deposits are the principal source of the out-of-core radiation fields and make the greatest contribution to personnel radiation exposure.

Various dilute chemical decontamination processes have been developed for use in boiling water reactors and pressurized water reactors. Typically, these processes dissolve the metal oxides and then recover the dissolved ions and the process chemicals on resin beds and filters. Various permanganate processes have been developed to oxidize such metal oxides as chromium (III) oxide. In alkaline-permanganate processes, coolant water containing potassium permanganate and sodium hydroxide is circulated through the reactor coolant system to oxidize chromium (III) oxide to chromium (VI) oxide, which is soluble in aqueous solutions. After the permanganate-containing water has been circulated for up to several hours, the residual amounts of unreacted permanganate in the coolant water and manganese dioxide formed in the chromium oxide oxidation step are "destroyed" or reduced to manganous ions with oxalic acid. Alternatively, acid permanganate and nitric acid permanganate processes for oxidizing chromium (III) oxide may be employed.

These permanganate chromium oxidation processes are normally combined with other known processes which reduce other metal oxides such as ferric oxide and nickel oxides (e.g., $NiFe_2O_4$) at the surface to acid soluble oxides. In the proprietary Can-Decon and Can-Derem processes, coolant water containing organic acids and typically having a pH of about 2.5–3 is circulated through the reactor coolant system. In the LOMI (Low Oxidation-state Metal Ion) process, coolant water containing vanadous formate and picolinic acid and typically having a pH of about 4–6 is circulated through the reactor coolant system. For a general discussion of these and other processes, M. E. Pick et al., "The Nature Of PWR Stainless Steel And Inconel Oxides In Relation To Decontamination In Permanganate Based (NP and AP) Processes", Water Chemistry Of Nuclear Reactor Systems 3, Vol. 1, British Nuclear Energy Society, London, 1983; T. Suwa, "Development of Chemical Decontamination Process with Sulfuric Acid-Cerium (IV) for Decommissioning", Journal of Nuclear Science and Technology, 23(76), pp 622–632, July 1986 and "Plant Decontamination Methods Review", Electric Power Research Institute, NP-1168, 1981. In practice, a succession of alternating permanganate chromium oxidation steps and nickel and iron reduction steps are performed to dissolve the surface oxides and thereby to decontaminate reactor systems to acceptably low levels.

The unreacted permanganate ions and manganese dioxide which forms in the course of the chromium oxidation step must be destroyed before the following iron and nickel reduction step is employed. Oxalic acid is generally employed for this purpose. However, oxalic acid generates a considerable amount of carbon dioxide in the course of the permanganate destruction process and has been found to be the cause of intergranular stress corrosion cracking in reactor coolant systems. Thus, the use of oxalic acid must be very carefully controlled. Accordingly, in decontamination processes, the permanganate-containing water temperature is lowered from the chromium oxidation temperature of about 90° C (190° F) to below a maximum of about 80° C (175° F). Because reactor coolant systems are particularly sensitive to intergranular stress corrosion cracking caused by solutions containing more than about 1000 ppm oxalic acid at temperatures of 90° C, oxalic acid is added to the reactor coolant systems such that the maximum oxalic acid concentration is less than about 750 ppm.

SUMMARY OF THE INVENTION

It is an object of the present invention to provide a permanganate chromium oxidation process which employs a reducing reagent in place of oxalic acid for destroying permanganate ions without causing stress corrosion cracking of the coolant system. It is a further object of the present invention to destroy the permanganate and manganese dioxide while generating substantially less carbon dioxide than is generated in a oxalic acid process.

With these objects in view, the present invention resides in a process for decontaminating a reactor coolant system contaminated with radioactive ions and particles which have been transported by flowing coolant water from a nuclear reactor vessel to the balance of the system where they deposit surfaces of chromium-containing oxides. In the improved process, coolant water containing permanganate ions is circulated throughout the reactor coolant system to oxidize chromium (III) oxidizes to chromium (IV) oxides. Formic acid is then added to the permanganate ion-containing coolant water. The formic acid-containing coolant water is then circulated to reduce the permanganate ion to manganous ions while generating about half as much carbon dioxide as is generated in oxalic acid processes. Advantageously, the formic acid also reduces the manganese dioxide to manganous ions.

In a preferred practice of the present invention, the formic acid is added to the permanganate ion-containing coolant water at a temperature of at least about 90° C, which is the operating temperature of the chromium oxidation step. Advantageously, critical path time is not lost in lowering the system temperature to less than about 80° C (in order to avoid stress corrosion cracking) and then raising the temperature back up to an appropriate operating temperature after the permanganate is substantially destroyed. Most preferably, the formic acid concentration of the reactor coolant at the beginning of the circulation step is at least about 750 ppm so that the destruction step can be performed as rapidly as possible to save critical path time.

The practice of the present invention is particularly useful for decontaminating reactor coolant systems in pressurized water reactors employing aqueous solutions containing substantial amounts of boron ions. In a preferred practice of the present invention, the reactor coolant water contains at least about 25 ppm boron. The coolant water preferably contains at least about 650 ppm boron at the end of a fuel cycle in a cold shutdown and preferably at least about 2,500 ppm boron in cases where fuel is in the core of the reactor in order to avoid criticality. The permanganate-containing water preferably contains about 500 ppm to about 1500 ppm permanganate and is maintained at a temperature of at least about 100° C and at a pH of at least about 10 during the chromium (III) oxidation step. (However, the pH of the water may vary from about 2 to about 12 at this point of permanganate processes. For example, in nitric acid-permanganate processes, the pH is preferably from about 2.5 to about 4.) The formic acid-containing coolant water initially contains at least about from 750 ppm to about 1500 ppm formic acid. Preferably, the coolant water contains at least about 10 ppm excess formic acid throughout the permanganate ion destruction step and is maintained at a temperature of at least about 90° C. The invention may be practiced in other reactor environments.

DESCRIPTION OF THE PREFERRED PRACTICE

Other advantages of the present invention will become more apparent from the following detailed description of a preferred practice thereof.

The preferred practice of the improved process will be further described in the context of the decontamination of a pressurized water reactor employing an alkaline permanganate process. However, the improved process alternatively may be employed to decontaminate boiling water reactors. Also, it may be alternatively employed with acid permanganate and nitric acid permanganate processes. In addition, these improved permanganate processes may be employed with Can-Derem, Can-Decon and LOMI reduction processes.

In an alkaline-permanganate practice, the oxidized metal surfaces in the reactor coolant system of a pressurized water nuclear reactor are oxidized and dissolved with a permanganate such as potassium permanganate and a hydroxide source such as sodium hydroxide. Other reactants may be alternatively employed, but potassium permanganate and sodium hydroxide are generally more economical. The coolant water in such a system will contain from about 25 ppm to about 2500 ppm boron, up to about 1 ppm lithium and no more than about 150 ppm total of chlorides, fluorides and sulfates. The metals in the system wetted by the water will normally include Type 304 and 316 stainless steel, Alloy 600, Alloy 690, Alloy X-750, Stellite 6 and 156 and other metals containing substantial amounts of chromium, iron and nickel.

In the permanganate oxidation step, the potassium permanganate is preferably added to the coolant water to maintain a permanganate ion concentration of between about 00 ppm and about 1500 ppm. The permanganate ion concentration may vary from about 20 ppm to about 2000 ppm over the course of the chromium oxidation step. The sodium hydroxide is preferably added to maintain the pH of the permanganate-containing primary water between about 9 and 12, and more preferably in the range of 10.5–11.5. The water is maintained at a temperature of at least about 90° C. (190° F.) while the water is circulated through the system. The permanganate ions in the circulating water are reduced to manganous ions and insoluble or colloidal manganese dioxides. At least some of the oxidized chromium oxides dissolve into the coolant water.

Formic acid is then added to the reactor coolant water at the end of the chromium (III) oxidation step in order to destroy or reduce residual amounts of the unreacted permanganate ions and manganese dioxide which forms in the course of the oxidation step to manganous ions. Advantageously, formic acid will reduce the manganese to manganous ions while generating only about half the carbon dioxide that is generated by oxalic acid. Importantly, it has been found that formic acid may be added to the reactor coolant water at temperatures of 90° C or more without causing stress corrosion cracking. Advantageously, the rate of reaction of the formic acid and the permanganate tends to increase with temperature. Preferably, the formic acid concentration is added to reactor coolant water which is at a temperature of between 90° C (195° F) and 116° C (240° F). In other practices of the present invention, the temperature of the reactor coolant water may be maintained at less than 90° C.

In addition, the formic acid is preferably added to the reactor coolant water to produce an initial concentration of more than 750 ppm in order to reduce the critical path time. Preferably, the initial formic acid concentration is from about 750 ppm to about 1500 ppm. Advantageously, it has been found that high concentrations of formic acid do not cause stress corrosion cracking even when added at temperatures of 90° C or more. The formic acid-containing coolant water is preferably circulated such that an excess of at least about 10 ppm formic acid is maintained to reduce the permanganate ions. The formic acid concentration may vary from about 20 ppm to about 2000 ppm over the course of the permanganate destruction step. Advantageously, it has been found that the carbon dioxide generated by the oxidation of formic acid may be maintained in solution as carbonate or bicarbonate (depending upon the pH) if the system pressure is maintained at a pressure of at least 400 psi. If the boron ion concentration is high, hydronium ions may need to be added from another source than formic acid to adjust the pH because high concentrations of boron tend to buffer the water. In prior art practices, hydronium ions were added by acid addition or via a strong cation resin exchanger to lower the pH to about 4–5.

After the free formate concentration of the coolant water has stabilized for a suitable length of time at a minimum pH of 5, the coolant water may be valved to resin beds for removing the metal ions (on a cation bed) and the formate ions and the oxidized chromate ions (on a anion bed). Preferably, the formate concentration has stabilized at least 10 ppm for at least about 15 minutes before the formate and other ions are removed by the ion exchange resins. Also, the conductivity of the coolant water is preferably reduced to less than about 50 microhms/cm and more preferably less than about 10 microhms/cm before the process is completed.

The alkaline-permanganate process may be followed by a Can-Derem, Can-Decon, LOMI, Citrox or other process for dissolving iron and nickel surface oxides on the wetted surfaces. Preferably, a series of alternating processes are employed to dissolve the surface oxides without significantly corroding the metals in the system during the decontamination process.

While a present preferred practice of the present invention has been described, it is to be understood that the invention may be otherwise variously embodied within the scope of the following claims of invention.

We claim:

1. A process for decontaminating a reactor coolant system wherein radioactive ions and particles are transported by flowing coolant water from a nuclear reactor vessel to the balance of the system where they deposit on chromium (III) oxide-containing surfaces, comprising the steps of:

circulating permanganate ion-containing reactor coolant water throughout a reactor coolant system to oxidize chromium (III) oxide surfaces of the system to chromium (IV) oxide, the reactor coolant water containing from about 20 to about 2000 ppm permanganate ion; and then adding formic acid to the permanganate ion-containing reactor coolant water to reduce the permanganate ions in the reactor coolant water to manganous ions.

2. The process of claim 1, wherein the formic acid is added to reactor coolant water having a temperature of from about 90° C. to about 116° C.

3. The process of claim 2, wherein the formic acid concentration of the reactor coolant water is from about 750 ppm to about 1500 ppm when the reactor coolant water is from about 90° C. to about 116° C.

4. The process of claim 1, wherein the reactor coolant system is maintained at a pressure of at least about 400 psig and carbon dioxide generated by the oxidation of formic acid is substantially maintained in solution.

5. The process of claim 1, wherein the coolant water contains from about 25 ppm to about 2,500 ppm boron.

6. The process of claim 1, including an additional step of valving the formate-containing reactor coolant water to ion exchange resins after the formate concentration of the reactor coolant water has stabilized at 10 ppm or more.

7. The process of claim 1, including an additional step of circulating the formate-containing reactor coolant water through ion exchange resin beds until the conductivity of the reactor coolant water is less than about 50 microhms/cm.

8. The process of claim 7, wherein the reactor coolant water is circulated through the ion exchange resin beds until the conductivity of the reactor coolant water is less than 10 microhms/cm.

* * * * *